United States Patent [19]

Turbak

[11] 3,864,499

[45] Feb. 4, 1975

[54] ADJUVENT CONTAINING POLYMERIC SAUSAGE CASING AND METHOD OF PREPARATION

[75] Inventor: Albin F. Turbak, Danville, Ill.

[73] Assignee: Tee-Pak, Inc., Chicago, Ill.

[22] Filed: July 20, 1970

[21] Appl. No.: 56,654

Related U.S. Application Data

[63] Continuation-in-part of Ser. No. 710,717, March 6, 1968, abandoned.

[52] U.S. Cl. .................. 426/138, 426/140, 426/105, 426/276, 106/166, 264/202
[51] Int. Cl. ............................................. A22c 13/00
[58] Field of Search ...... 99/176, 175; 106/166, 168, 106/115 FP, 124, 127, 128, 129; 264/202; 260/6–8; 426/138, 140, 105, 276

[56] References Cited
UNITED STATES PATENTS

| | | | |
|---|---|---|---|
| 1,819,241 | 8/1931 | Kirschberger | 106/166 |
| 2,063,001 | 12/1936 | Siebourg | 106/166 |
| 2,081,847 | 5/1937 | Byron | 106/166 |
| 2,166,741 | 7/1939 | Karplus | 106/166 X |
| 2,211,961 | 8/1940 | Meigs | 260/6 UX |
| 2,233,885 | 3/1941 | Kratz | 260/6 |
| 2,245,499 | 6/1941 | Reichel | 106/128 |
| 2,790,721 | 4/1957 | Toulmin | 99/176 X |
| 2,858,225 | 10/1958 | Gooding | 99/175 X |
| 2,979,410 | 4/1961 | Pailour | 99/176 X |
| 3,224,885 | 12/1965 | Shinev | 99/175 X |
| 3,296,000 | 1/1967 | Bockno | 106/168 X |
| 3,351,531 | 11/1967 | Nuznick | 106/124 |
| 3,427,169 | 2/1969 | Rose | 99/176 |
| 3,431,127 | 3/1969 | Buetzel | 106/168 |
| 3,508,942 | 4/1970 | Nobs | 106/168 |
| 3,607,328 | 9/1971 | Rose | 106/166 |

*Primary Examiner*—Robert Halper
*Attorney, Agent, or Firm*—Neal J. Mosely; Russell L. Brewer

[57] ABSTRACT

Shaped polymer products formed of film-forming, hydrophilic (e.g. swells in water) polymers, such as cellulose sausage casings, are modified by incorporating oil-soluble adjuvants, e.g., antimycotic agents, in particles or droplets of an oil finely dispersed throughout the shaped polymer article, e.g., a film. In preparing the modified shaped polymer articles, the oil-soluble adjuvant and oil are dissolved in a suitable solvent (e.g. THF, dioxane, or $CS_2$) which also is a co-solvent for a solubilized form of the film-forming polymer, the co-solvent solution and solubilized form of the film-forming polymer are mixed, the resultant mixture is shaped (e.g. extruded), the film-forming polymer is coagulated and regenerated, and the co-solvent is removed from the resultant shaped article to produce the modified shaped polymer article.

22 Claims, No Drawings

ADJUVENT CONTAINING POLYMERIC SAUSAGE CASING AND METHOD OF PREPARATION

RELATED APPLICATION

This application is a continuation-in-part of copending application Ser. No. 710,717, filed Mar. 6, 1968, now abandoned.

BACKGROUND OF THE INVENTION

This invention relates to the production of modified shaped articles of film-forming polymers such as regenerated cellulose films, fibers, sausage casings, etc., and particularly to a process for the incorporation of adjuvants into shaped polymer articles to modify same and to the resulting modified film products.

In the manufacture of cellulose films such as sausage casings, one of the problems encountered in the manufacture of certain casings is the control or inhibition of fungus growth. Spores of fungi cannot germinate without moisture and the development of fungus growth on cellulose can be controlled by keeping the moisture content below a predetermined level. In some cases, however, proper moisture control cannot be maintained and the formation of mold, yeast or other fungus growth may be an important but sporadic problem. In cases where fungus growth cannot be controlled by proper control of the moisture content, it is necessary to provide a chemical means to inhibit fungi.

To induce mold or other fungus growth, two factors are necessary, viz., contamination and the presence of proper conditions for continued growth of that contamination. If one fails to limit mold or other fungus growth on cellulose casings by physiochemical means, the second factor becomes important. Spores of fungi cannot germinate without moisture. Cellulose casing has a critical moisture point for prevention of fungus growth. Above this moisture point or level, the moisture level of the casing enhances growth and spread of mold, yeast or other fungi over the surface of the contaminated casing.

When the cellulose sausage comes out of the regenerating bath, the surface is probably sterile so far as fungi are concerned. Subsequent fungus growth, therefore, is due to the fact that the cellulose casing is contaminated with microorganisms after leaving the regenerating bath. On a dry cellulose casing after regeneration, molds and other fungi can develop upon storage if the casing is contaminated and sufficiently moist. Therefore, just as soon as the casings have been dried, they should be packaged to avoid contamination. The casing, as delivered to the user, are essentially free of fungus contamination.

There are relatively numerous reports of fungus growth upon certain types of moist or wet sausage casing. These have shown that practically every fungus can grow on the moist casing and thus form a slime. The physical conditions, as related to the kinds of fungus, are important in the problem of preventing fungus growth on sausage casings. It is possible on rare occasions that cellulose sausage casings will contain fungi. Furthermore, the casing can become contaminated during handling or stuffing. Accordingly, edible chemical additives for incorporation into the cellulose casing have been investigated which, under certain conditions, will inhibit the growth of fungi.

Regerated cellulose sausage casings are normally manufactured by the viscose process. Viscose, of a suitable compsition, is extruded through an annular die into a coagulating and regenerating bath to provide a hollow, thin-walled tube of coagulated and partially regenerated cellulose xanthate. The extruded tube is subsequently treated in an acid bath to thoroughly regenerate the cellulose, and is subsequently washed to remove by-products. The regenerated cellulose tube is eventually treated with an aqueous solution of glycerin or other plasticizer and then dried and wound on reels.

A type of casing known in the art as fibrous casing is manufactured by forming a long fiber hemp paper into a continuous tube, impregnating the tube with viscose, and treating the impregnated tube with a coagulating and regenerating bath to produce a paper-reinforced tube of regenerated cellulose. In the manufacture of fibrous casing, the reinforcing paper or web represents about 35–40 percent wt. of the casing, and the regenerated cellulose and water and glycerin present as plasticizer constitute the balance of the casing. The fibrous casing is washed after the coagulation and regeneration baths and is finally subjected to treatment with an aqueous glycerin solution for plasticizing and is finally dried and reeled. Both the clear regenerated cellulose casings and fibrous casings contain about 35–50 g. of glycerin plus water per 100 g. of regenerated cellulose or regenerated cellulose plus paper, in the case of the fibrous casing. The relativey high proportion of glycerin and water in the casing is required to keep the casing soft and pliable so that it is not cracked or torn easily during handling and further processing.

Attempts to incorporate antimycotics such as sorbic acid and its derivatives (e.g., potassium sorbate and calcium sorbate) as viscose additives have been unsuccessful because the sorbic acid or its derivatives are either water-soluble per se or are converted to water-soluble products by the viscose alkali and are washed out rather completely during subsequent processing steps. Furthermore, simply adding such materials to the final plasticizing bath and drying will incorporate a degree of fungus resistance to large cellulose casings during storage, but such antimycotics will be removed during the soaking cycle which always precedes the stuffing operation and thus will not provide any functional antimycotic value on the stuffed product. By the use of the method of this invention, the antimycotic is thoroughly protected against removal by dissolution in the oil and remains within the casing during the extrusion thereof and throughout the processing and handling.

The problems discussed above with regard to attempts to suitably incorporate antimycotics into regenerated cellulose film similarly are encountered any time one attempts to satisfactorily modify any shaped article of a film-forming polymer by an introduction of an adjuvant.

STATEMENT OF OBJECTS AND FEATURES

Accordingly, it is the primary object of this invention to provide shaped articles of film-forming polymers modified by an incorporation therein of adjuvants.

It is another object of this invention to provide shaped articles, e.g., films, filaments, beads, and other shaped forms, of film-forming polymers modified by an incorporation therein of oil-soluble adjuvants such as biocides, anti-oxidants, flavoring agents, perfumes, dyes, ultraviolet light absorbers, and the like.

It is a particular object of this invention to inhibit the growth of fungi under certain conditions on regenerated cellulose sausage casings and other films.

It is another particular object of this invention to incorporate oil-soluble, edible antimycotic (preferably Food and Drug Administration approved) chemical additives into cellulose sausage casings.

Still another particular object of this invention is to protect cellulose sausage casings even against fungus contamination introduced during stuffing or subsequent processing.

A feature of this invention is a method for the incorporation of adjuvants into shaped articles of film-forming polymers.

Another feature of this invention is a shaped article, e.g., a film, filament, bead, or other shaped form, of a film-forming polymer, having dispersed therein an oil-soluble adjuvant such as a biocide, anti-oxidant, flavoring agent, perfume, dye, ultraviolet light absorber, or the like.

A particular feature of this invention is a method for the incorporation of an edible oil-soluble antimycotic (preferably Food and Drug Administration approved) chemical additive into regenerated cellulose sausage casing.

Another particular feature of this invention is a regenerated cellulose sausage casing having an edible oil-soluble, antimycotic (preferably Food and Drug Administration approved) chemical additive incorporated therein in particles or droplets of oil.

Other objects and features of this invention will become apparent from time to time throughout the specification and claims as hereinafter related.

SUMMARY OF THE INVENTION

In accordance with this invention, it has been discovered that oil-soluble adjuvants of a desired functional property advantageously can be incorporated into shaped articles of hydrophilic (e.g., water-swellable) film-forming polymers by the use of (1) an oil which forms colloidal sized particles or droplets when dispersed in the film-forming polymer and in which the adjuvants selected are soluble or dispersible and (2) a solvent which is a co-solvent for the oil and a solubilized form, i.e., a solution, of the film-forming polymer. In accordance with the present method, a solution or dispersion of the adjuvant and oil initially is produced in the co-solvent, the co-solvent solution and a solubilized form of the film-forming polymer are admixed, and the resultant admixture is extruded into the desired shape. The film-forming polymer then is coagulated and regenerated by treatment in a coagulation bath or by evaporation, and during and/or after regeneration, the co-solvent is removed from the shaped article to produce a fine, essentially colloidal dispersion of the auxiliary material throughout the shaped article containing the adjuvant therein.

Certain edible oil-soluble antimycotics, for example, can be incorporated into film-forming polymers in which oils form colloidal sized particles or droplets when dispersed therein (e.g., regenerated cellulose) by the solution thereof in one or more oils and a co-solvent and the solution admixed in the viscose prior to extrusion to achieve an antimycotic effect in the product. Preferred Food and Drug Administration approved, oil-soluble antimycotics are the methyl, ethyl or propyl esters of parahydroxybenzoic acid. Preferred co-solvents for the oil and antimycotic agent are carbon disulfide, tetrahydrofuran and dioxane. The co-solvent is removed as by washing after extrusion and by subsequent evaporation during drying to produce a fine dispersion (essentially colloidal) of oil droplets in the regenerated cellulose film containing the antimycotic agent therein.

By an identical technique, any other desired oil-soluble adjuvants can be incorporated into regenerated cellulose and any desired oil-soluble adjuvants can be incorporated into other hydrophilic (e.g., water-swellable) film-forming polymers such as amylose, polyvinyl alcohol, polyallyl alcohol, gelatin, carboxymethyl cellulose, alginates, gum acacia, and the like.

DESCRIPTION OF THE PREFERRED EMBODIMENTS

Novel modified shaped articles such as films, filaments, fibers, and beads are produced in accordance with the present invention from hydrophilic and water-swellable film-forming polymers such as regenerated cellulose, amylose, polyvinyl alcohol, polyallyl alcohol, gelatin, carboxymethyl cellulose, and gum acacia by "microdispersing" therein droplets or particles of an oil in which is dissolved one or more oil-soluble adjuvants.

In accordance with the present method, the film-forming polymer initially is converted into an extrudable, solubilized form by dissolving the polymer itself in a suitable solvent or by preliminarily or simultaneously with the formation of the solution thereof converting the polymer into a soluble derivative (e.g., cellulose xanthate) from which the film-forming polymer can be regenerated in a suitable regenerated bath and the like. Although organic solvent solutions of the polymers are contemplated for use, the preferred film-forming polymer solutions are aqueous systems. The oil-soluble adjuvant and oil then are dissolved in an inert solvent which is soluble or dispersible in the film-forming polymer solution. The polymer and co-solvent solutions then are mixed, the resultant miscible mixture is extruded into the desired form, the film-forming polymer is coagualted and regenerated by conventional methods using available baths (e.g., aqueous saturated salt solutions or organic non-solvents for the film-forming polymer) and/or solvent evaporation, and any co-solvent remaining in the regenerated article is removed by washing and/or evaporation. The resultant article is a novel modified product throughout which is dispersed colloidal sized particles or droplets of an oil solution of the oil-soluble adjuvant or adjuvants.

In a preferred embodiment of the present method, novel extruded regenerated cellulose articles, e.g., films, etc., both transparent and delustered (translucent) may be modfied by incorporating into the extrudable viscose a solution of one or more oils and an oil-soluble adjuvant in an inert co-solvent which is water-soluble or -dispersible (viscose-soluble or-dispersible). The oil is substantially immiscible with the extrudable viscose. The oil and adjuvant are first prepared in an inert co-solvent and the solution is dispersed into the viscose for extrusion therewith. The mixture which is produced by dispersing the solution into the viscose is then extruded through a suitable die to produce a produce of predetermined shape. The co-solvent is removed from the extruded product in the wash baths or in the dryer to produce a dispersion of the oil-containing dissolved adjuvant in fine particles or droplets of colloidal size throughout the product.

In accordance with the present method, any oil-soluble adjuvant or combination of oil-soluble adjuvants advantageously can be incorporated into a shaped article formed of a hydrophilic film-forming polymer. The activity of the adjuvant is not critical. By means of the present invention, for example, oil-soluble adjuvants such as anti-oxidants (e.g., butylated hydroxyanisole, di-tert-butyl-p-cresol, and propyl gallate), biocides such as bacteriostats (e.g., hexachlorophene) and antimycotics (e.g., the lower alkyl esters of parahydroxybenzoic acid, flavoring agents and perfumes (e.g., oil of wintergreen and other essential oils), coloring agents such as dyes (e.g. phenylazo-2-napthol and p-diethylamino azobenzene), radiation screening agents such as ultraviolet absorbers (e.g., 2-hydroxybenzophenone), and the like may be incorporated into shaped articles.

A special feature of the present method is the production of shaped articles formed of regenerated cellulose and other hydrophilic mold-growth supporting, film-forming polymers having improved mold-growth resistance. This is accomplished by including in the adjuvant component employed at least one oil-soluble antimycotic. The "microdispersion" of the oil-soluble antimycotic throughout the shaped article by the present method advantageously imparts significantly improved antimycotic properties. The present method, for example, finds excellent application in the production of improved packaging films and sausage casings formed of film-forming polymers such as regenerated cellulose. In such cases, the antimycotic employed is a Food and Drug Administration approved antimycotic and more preferably one of the lower alkyl, e.g., methyl, ethyl, propyl or hexyl, esters of parahydroxybenzoic acid, and sufficient antimycotic generally is applied to produce a casing containing from about 20 to about 2,000 p.p.m. of the antimycotic based on the film dry weight. Such produces have improved antimycotic properties upon extended storage, processing and handling. This method is primarily useful in the preparation of regenerated cellulose sausage casings. Such casings frequently remain in extended storage both in the unstuffed and stuffed states. In particular, such casings are used in the production of dry sausage produces wherein the stuffed sausage is stored and cured for 2–3 months.

The oil is selected for desired physical properties and chemical inertness under the conditions of manufacture. The term "oil" is intended to refer to oils which are immiscible with the film-forming polymer and thus are capable of forming colloidal sized particles or droplets when dispersed in the regenerated film-forming polymer and to generally include all oleaginous materials having this property including those of vegetable, animal, or mineral origin and natural and synthetic materials of a solid, liquid or gelatinous nature. Typical oils which may be used include but are not limited to castor oil, corn oil, soya oil, peanut oil, safflower oil, tung oil, lard oil, mineral oil, hydrocarbon wax, and derivatives or mixtures thereof.

Co-solvents which are used in this method are selected for chemical inertness, easy removal, e.g., due to either their solubility or their low boiling point, and utility as solvents for the oil and adjuvant. In the preferred systems in which the film-forming polymer solution is an aqueous solution, the co-solvent is water-soluble or water-dispersible. If the co-solvent in such systems is not water-soluble but merely water-dispersible, it should have a relatively low boiling point. Suitable co-solvents used with aqueous and organic solvent systems include ethers, including cyclic ethers such as dioxane and tetrahydrofuran, and halogenated ethers such as dichlorodiethyl ether, halogenated hydrocarbons including carbon tetrachloride, methylene dichloride, dichloroethylene and mixed chlorofluorohydrocarbons (Freons) having sufficiently low boiling points, dimethyl formamide, dimethyl sulfoxide, etc.

Throughout this specification proportions of ingredients are expressed as weight per cent or parts by weight unless otherwise specified.

The following nonlimiting examples are illustrative of this invention.

EXAMPLE 1

A commercial viscose is prepared having a 7.7 percent cellulose content. A solution is prepared consisting of 3 parts mineral oil and 3 parts castor oil in 8 parts of 1,4-dioxane. The methyl ester of parahydroxybenzoic acid, an antimycotic, is then dissolved in the oil solution in an amount sufficient to incorporate 50 p.p.m. of antimycotic in the regenerated cellullose product to be produced. The solution is finely dispersed in the viscose in an amount sufficient to produce a mixed oil content of 3 percent wt. based on the cellulose content of the viscose.

The mixture of oils, antimycotic, co-solvent and viscose is extruded through an annular die to produce a tubular casing in accordance with well-known procedures for the preparation of regenerated cellulose casing. The viscose-oil-co-solvent-antimycotic mixture is extruded through a die into a conventional coagulating and regenerating bath and subsequently washed and dried.

The washing and drying of the regenerated cellulose casing is effective to remove all of the dioxane from the product and leave a highly delustered and antimycotic casing. When the solvent is washed and/or evaporated from the regenerated cellulose casing, there are formed a large quantity of opalescent particles or droplets uniformly dispersed throughout the wall of the casing.

The oil may vary from the minimum necessary to dissolve the necessary antimycotic to 12 percent by wt. of the regenerated cellulose casing without substantial loss in strength. The necessary antimycotic is about 20 parts per million by weight in the casing, preferably from about 50 to about 500 parts per million by weight, and seldom more than about 2,000 parts per million by weight.

EXAMPLE 2

The procedure of Example 1 is repeated except that the mixture of oil, antimycotic, co-solvent and viscose is extruded through a narrow slit as a flat sheet to produce a flat packaging film.

EXAMPLE 3

A commercial viscose is produced having a 7 percent cellulose content. A solution is then prepared consisting of 6 parts castor oil (a vegetable oil) or a mineral oil in 8 parts of carbon disulfide. Into the solution is dissolved a sufficient amount of the ethyl ester of parahydroxybenzoic acid, an antimycotic, to incorporate 20 parts per million by weight of the antimycotic in the regenerated cellulose product to be produced. The solution is added to the viscose in an amount sufficient to produce an oil content of 3 percent wt. based on the cellulose content of the viscose.

The mixture of oil, antimycotic, co-solvent and viscose is extruded through an annular die to produce a tubular casing in accordance with well-known procedures for the preparation of regenerated cellulose casing. The mixture is extruded through a die into a conventional coagulating and regenerating bath and subsequently washed and evaporated by drying.

The washing and drying of the regenerated cellulose casing is effective to remove all of the carbon disulfide from the product and produce a cellulose casing containing a colloidal dispersion of oil droplets containing sufficient antimycotic agent to inhibit fungus growth on the casing or on a stuffed sausage product.

EXAMPLE 4

This example shows the application of the method of this invention to fibrous types of casing instead of clear, regenerated cellulose sausage casings. Fibrous casing is regenerated cellulose casing reinforced with a hemp fiber paper. It is manufactured by forming a long fiber hemp paper into a continuous tube, impregnating the tube with viscose, and treaating the impregnated tube with a coagulating and regenerating bath to produce a paper reinforced tube of regenerated cellulose. In the manufacture of fibrous casing, the reinforcing paper of web represents about 35–40 percent wt. of the casing, and the regenerated cellulose and water and glycerin present as plasticizer constitute the balance of the casing. The fibrous casing is washed after the coagulation and regeneration baths and is finally subjected to treatment with an aqueous glycerin solution for plasticizing and is finally dried and reeled. Fibrous casings, like clear regenerated cellulose casings, contain about 35–50 g. of glycerin plus water per 100 g. of regenerated cellulose or regenerated cellulose plus paper, in the case of the fibrous casing.

A commercial viscose is produced having an 8 percent cellulose content. A solution is then prepared consisting of 6 parts of corn oil in 8 parts of tetrahydrofuran in which there is dissolved a sufficient amount of methyl ester of parahydroxybenzoic acid to incorporate about 100 parts by weight of the ester in the fibrous casing which is to be produced. The solution is then added to the viscose in an amount sufficient to produce an oil content of 4 percent wt. in the fibrous casing.

The mixture of oil, antimycotic ester, co-solvent and viscose is impregnated into a paper tube and treated as above to produce a fibrous casing in accordance with this invention.

When the methyl-, ethyl-, or propyl esters of parahydroxybenzoic acid are incorporated in the oil solutions used in the preparation of delustered casings as disclosed in U.S. patent application Ser. No. 763,942 filed Sept. 30, 1968, proare obtained which are both delustered and antimycotic. These oil-soluble antimycotics are incorporated in the oil solutions at a concentration sufficient to incorporate 20–2000 p.p.m. of the antimycotic in the casing product.

The antimycotic agent containing cellulose films and casings produced in accordance with this invention possess improved and prolonged antimycotic activity. Such products produced in accordance with this invention are satisfactory as films and casings for food packaging or for processing of sausage meats. The oils used are nontoxic. The method is simple and inexpensive to carry out and produces novel produces with an improved and prolonged resistance to fungi. In particular, summer sausages and dry sausages have been stuffed and stored for 2–3 months without any fungus attack.

EXAMPLE 5

The procedure of Example 2 is repeated to produce a series of flat sheets excepting (1) an aqueous 10 percent solution of a film-forming polyvinyl alcohol resin (average molecular weight about 1200; hydroxyl groups content about 98 percent based on total potentially available sites) formed by dissolving the resin at about 100°C. and then slowly cooling the solution, an aqueous 15 percent solution of a film-forming amylose ("Nepsol" A. E. Staley Manufacturing Co.) formed by heating a dispersion of the resin in a steam jet at about 100°C. and then slowly cooling the solution, an aqueous 20 percent gelatin solution, and an aqueous 25 percent carboxymethyl cellulose solution, each in turn, is substituted for viscose as the extrusion die feed, and (2) the plasticizing step is eliminated. Otherwise, the extrusion, coagulation, washing, and drying steps are carried out as in Example 2.

The resultant films produced all contain a colloidal dispersion of oil droplets containing sufficient antimycotic agent to inhibit fungus growth in the film.

EXAMPLE 6

The procedures of Examples 2 and 5 are repeated to produce another series of films excepting propyl gallate (an antioxidant), hexachlorophene (a bacteriostat), p-diethylamino azobenzene (a dye) and 2-hydroxybenzophenone (an UV absorber), each in turn, is also incorporated into each polymer film via the oil at levels of about 0.1 percent by weight of the oil.

In the resultant films produced the adjuvants are uniformly microdispersed throught the films in solution in colloidal droplets of the oil.

While this invention has been described fully and completely with special emphasis upon several preferred embodiments, I wish it to be understood that within the scope of the appended claims, this invention may be practiced otherwise than as specifically described herein.

I claim:

1. A method of preparing an adjuvant-containing shaped article formed of a hydrophilic film-forming polymer which comprises
   a. preparing a solution of at least one oil capable of forming colloidal sized particles or droplets when dispersed in the film-forming polymer and an oil-soluble adjuvant in an inert co-solvent which is soluble or dispersible in a solution of said film-forming polymer or a derivative thereof,
   b. dispersing said solution of said oil and said oil-soluble adjuvant into said polymer-containing solution,
   c. extruding the resulting dispersion to produce a shaped article,
   d. coagulating and regenerating said extruded shaped article, and e. removiing said inert co-solvent to produce a dispersion of said adjuvant throughout said extruded article as a solution in fine particles or droplets of said oil of colloidal size.

2. A method as defined in claim 1 in which said polymer-containing solution is viscose and the resultant shaped article is formed of regenerated cellulose.

3. A method as defined in claim 1 in which said film-forming polymer is a film-forming polyvinyl alcohol resin.

4. A method as defined in claim 1 in which said film-forming polymer is amylose.

5. A method as defined in claim 1 in which said film-forming polymer is collagen.

6. A method of preparing an antimycotic food packaging film of regenerated cellulose as defined in Claim 1 which comprises,
   a. preparing a solution of at least one oil capable of forming colloidal sized particles or droplets when dispersed in regenerated cellulose and an edible oil-soluble antimycotic in an inert co-solvent which is soluble or dispersible in viscose,
   b. dispersing said solution of said oil and said oil-soluble antimycotic into viscose,
   c. extruding the resulting dispersion to produce a film,
   d. coagulating and regenerating said extruded film, and,
   e. removing said inert co-solvent to produce an antimycotic effect throught said extruded film comprising a dispersion of said antimycotic as a solution in fine particles or droplets of said oil of colloidal size.

7. A method as defined in claim 6 in which said antimycotic is the methyl, ethyl or propyl ester of parahydroxy-benzoic acid.

8. A method as defined in claim 7 in which said antimycotic comprises from about 2 to about 2000 parts per million by weight of the product.

9. A method as defined in claim 7 in which the product is a sausage casing.

10. A method as defined in claim 7 in which the inert co-solvent is evaporated from the product.

11. A method as defined in claim 7 in which the inert co-solvent is washed from the product.

12. A method as defined in claim 8 in which said oil is a vegetable oil or a mineral oil, or a mixture thereof.

13. A method as defined in claim 8 in which said oil is castor oil or mineral oil and said co-solvent is dioxane.

14. A method as defined in claim 13 in which said oil is a mixture of castor oil and said mineral oil present in approximately equal parts by weight.

15. An adjuvant-containing shaped article comprising a shaped article of a hydrophilic film-forming polymer throughout which is dispersed colloidal sized particles or droplets of a non-volatile oil solution of an oil-soluble adjuvant which remain after forming and drying of said article.

16. A shaped article as defined in claim 15 formed of regenerated cellulose.

17. A shaped article as defined in claim 15 formed of a film-forming polyvinyl alcohol resin.

18. A shaped article as defined in claim 15 formed of amylose.

19. A shaped article as defined in claim 15 formed of collagen.

20. A shaped article as defined in claim 15 in the form of a film.

21. A shaped article as defined in claim 16 in the form of a film.

22. A antimycotic food packaging film as defined in claim 21 comprising a film of regenerated cellulose throughout which is dispersed colloidal sized particles or droplets of an oil solution of an edible oil-soluble antimycotic, the amount of said antimycotic being in the range of from about 20 to about 2000 parts per million by weight of said casing.

* * * * *